United States Patent Office 3,725,100
Patented Apr. 3, 1973

3,725,100
METHOD FOR PROCESSING KAOLIN CLAY COATING PIGMENT AND IMPROVED PRODUCT THEREOF
William E. Zentz, Jr., Iselin, N.J., assignor to Engelhard Minerals and Chemicals Corporation, Woodbridge, N.J.
No Drawing. Continuation-in-part of applications Ser. No. 813,277, Apr. 3, 1969, and Ser. No. 887,384, Dec. 22, 1969. This application Feb. 17, 1971, Ser. No. 116,219
Int. Cl. C08h 17/06; C08k 1/12
U.S. Cl. 106—288 B                    19 Claims

ABSTRACT OF THE DISCLOSURE

A small amount of boric acid or an acid-soluble borate salt is added to acidic, bleached kaolin clay in the presence of zinc ion before deflocculating an aqueous suspension of the clay with a sodium condensed phosphate salt.

RELATED APPLICATIONS

This application is a continuation-in-part of my co-pending applications Ser. No. 813,277, filed Apr. 3, 1969 and Ser. No. 887,384, filed Dec. 22, 1969, both now abandoned.

BACKGROUND OF THE INVENTION

Finely divided refined kaolin clay is widely used as a pigment to provide a smooth, glossy white opaque surface finish on quality printing paper. The clay is applied as an aqueous "coating color" which comprises clay pigment, deflocculating agent for the clay and suitable adhesive such as latex, starch or mixtures of latex with protein. Present-day coatings are applied at high machine speeds which necessitate the use of high solids coating colors. The formulation of coating colors at high solids requires the initial provision of fluid high solids clay-water suspensions. These suspensions are subsequently mixed with adhesive dispersions or suspensions to prepare the coating color. High solids clay-water suspensions generally contain in excess of 65 percent clay solids (65 parts by weight dry clay to 35 parts by weight water). A strong deflocculating agent, conventionally a sodium condensed phosphate salt, must be present in the high solids suspensions in order to impart fluidity since the systems would be solid or solid masses in the absence of a powerful deflocculating agent. The step of preparing such deflocculated suspensions is generally referred to as a "makedown."

Kaolin clay pigments must meet certain requirements with regard to rheological properties and to the properties of the coated sheet material. The apparent viscosity of the initial high solids deflocculated suspension of the clay coating pigment must be sufficiently low to permit mixing and pumping. After adhesive is incorporated the resulting coating color must have suitable viscosity for handling and application to the paper. The coating should be as white, bright and smooth as possible. In addition, it is highly desirable to obtain a coated calendered sheet which is as opaque as possible since the opacity of the coated sheet has a significant effect on the appearance of the printed sheet. Normally high gloss is desirable. Adequate resistance to pick is also necessary.

Kaolin coating pigments derived from sedimentary kaolin crudes are normally obtained by wet processing methods. The wet processing normally includes a reducing bleach treatment which is applied to an acidic, flocculated pulp of the clay and is followed by filtration and washing. To provide "predispersed" kaolin pigments, the washed filter cakes are fluidized by addition of suitable dispersing (deflocculating) agent. The fluidized filter cake may be spray dried to provide predispersed microspheres. Alternatively, the solids content of the fluidized cake may be adjusted to a desired level by further addition of clay and dispersant to provide a deflocculated clay suspension or slip which is shipped in that form. Acid kaolin clay pigments are obtained by pulverizing the dried acidic filter cake without addition of a dispersant. During makedown the acidic pigments are deflocculated in water, usually with a condensed phosphate salt.

Irrespective of the form in which the clay is supplied, the clay remains in deflocculated condition after the adhesive suspension is incorporated. Thus, a general characteristic of clay coating colors for paper use is that the clay is in deflocculated condition. This is also true of clay-pigmented latex paints.

Theoretically the opacity of a clay pigmented film may be increased by applying the clay to the substrate in a flocculated state or condition. However, this is not possible within the limits of present-day knowledge and technology. The adhesives or binders that are used in preparing paper coating compositions and paints have a peptizing effect on clay pigments. Therefore, deflocculation would occur even if the clay pigment were originally provided in the form of a flocculated suspension.

In order to improve the opacity of kaolin films it has been considered necessary to incorporate with the clay a pigment having a higher refractive index than that of clay. Titania is generally the opacifying pigment of choice. The disadvantage of using titania to increase the opacity of clay pigmented coatings is that the use of an effective quantity of titania adds significantly to raw material costs. It would obviously be advantageous for reasons of economy alone to increase the opacifying properties of the kaolin clay pigment per se, provided that such pigment could be formed into a deflocculated high solids suspension and coating composition having satisfactory rheological properties.

THE INVENTION

An object of the invention is to provide a method for improving the opacity of kaolin clay pigmented coatings without impairing other desirable properties of the clay.

Another object is to provide a simple modification in the conventional wet processing of kaolin clay pigment which results in an improvement in various pigmenting properties of the clay, the improvements including increased opacity of the clay-coated substrates.

Another object is to provide deflocculated kaolin clay pigments characterized by improved opacity and, in some cases, improved gloss, pick resistance and/or increased pigment brightness.

Briefly stated, in accordance with the present invention, a small amount of a source of borate ions, preferably alkali metal borate salt, ammonium borate salt or boric acid, is incorporated with kaolin clay in the presence of water and zinc ions at an acidic pH, the source of the borate ions being added in amount insufficient to neutralize or to deflocculate the clay. The acidic clay is then deflocculated and the pH is increased by adding a dispersant-effective proportion of a condensed phosphate salt.

An essential feature of the invention resides in the addition of the borate ions prior to complete deflocculation of the clay. The clay product may produce excessively viscous clay-water suspensions and the desired improvement in opacity is not realized when a source of borate ions is added to deflocculated clay.

Another feature resides in the use of a small amount of borate compound, generally less than 1 percent of the weight of the clay. When used in substantial excess, the clay will produce undesirably viscous suspensions when deflocculated with condensed phosphate salt.

Still another feature residues in the treatment of a clay containing zinc ion.

In an embodiment of the invention the clay contains a significant amount of zinc ion as a result of the addition of a soluble zinc salt, especially the addition of zinc hydrosulfite to an acidic pulp of the clay for the purpose of bleaching the clay.

In an especially preferred embodiment of the invention, the source of borate ions is added to an acidic pulp of kaolin clay which has been bleached with zinc hydrosulfite or other zinc bleach reagent prior to a filtration step. The acidic filter cake which is obtained thereby is subsequently washed and deflocculated. It is preferable to incorporate the borate ions into a pulp of clay prior to filtration because it will be easier to provide a uniform mixture than it would be if the borate compound were added to a filter cake. Furthermore, the borate-treated clay generally produces deflocculated high solids clay-water suspensions having better rheological properties (lower viscosity) when the borate salt is added prior to filtration.

The filter cake may be deflocculated to provide a high solids suspension for shipment or use. In an especially preferred form of the invention, the acidic, borate-treated filter cake is deflocculated with a condensed phosphate salt of a solids level suitable for spray drying and the deflocculated suspension is spray dried to provide a predispersed clay pigment in the form of microspheres.

It is within the scope of the invention to add the borate compound to acidic bleached clay after filtration and during "makedown" provided most of the borate is added before the clay is completely deflocculated.

PRIOR ART

U.S. 2,251,256 to Feldhenheimer discloses the addition of large quantities of an alkali, of which borax is listed as an example, to an acidic slip of zinc hydrosulfite bleached kaolin. Sufficient alkali is added to effect thickening of the slip. According to the teachings of the patent, precipitation of zinc hydroxide takes place at the time thickening occurs and an improvement in clay color results. This thickening occurs at a high pH and alkali must be added in amount substantially in excess of that required to neutralize (and fluidize) the acidic bleached pulp. The addition of alkali to an acidic slip of zinc hydrosulfite clay in order to render the clay highly alkaline and to flocculate it represents the antithesis of the present invention in which the quantity of borate salt which is incorporated is insufficient to neutralize the clay, much less being sufficient to thicken the clay pulp. This difference is demonstrated by the fact that about 50 pounds of borax was required to thicken a bleached pulp containing 100 pounds of a clay. The thickened pulp could not be prepared into a high solids fluid slip even after controlled amounts of condensed phosphate dispersant were added. In contrast, only 0.5 pound of borax, when added in accordance with the principles of the present invention, would have resulted in the desired improvement in pigment opacity without adversely affecting rheology.

U.S. 3,546,113 to Seller describes the flocculation of suspended matter in water by the use of a water-soluble zinc salt in an environment in which an alkali metal borate salt is used to buffer pH within a mildly alkaline range. The mechanism by which the borate salt functions to improve clay opacity when carrying out the method of the subject invention is not known. It is possible that a flocculation phenomenon is involved and that zinc ions are active in effecting the flocculation. However, any flocculation which may occur must be selective or limited since the borate-treated clay as a whole appears to be in well-deflocculated state or condition both after make down and in a finished coating colors.

The use of borate salts, especially ammonium borate, to solubilize a casein adhesive for a coating composition also differs from the practice of the invention wherein similar borate salts must be added to a clay pigment prior to deflocculation and hence before mixing pigment with adhesive such as solubilized casein.

DESCRIPTION

Practice of the method of the invention has produced essentially noteworthy results with extremely fine kaolin clays, exemplified by degritted kaolin clay obtained from hard crudes and having an average particle size below 0.5 micron, equivalent spherical diameter. Application of the invention to a coating fraction from such crude (0.3 micron average equivalent spherical diameter) has resulted in a pigment having the opacifying properties comparable to that of a high brightness coating fraction (0.55 average particle size) from a soft crude. Gloss and pick were also improved. In order to obtain a comparable improvement in opacity with the hard clay without incorporating borate ions it was necessary to blend the clay with 4 percent $TiO_2$.

Bleached mechanically ground coarse kaolin, exemplified by the fine clay prepared in accordance with the disclosure of U.S. 3,097,801 to Duke, has also been benefited. An improvement in opacity was also achieved with No. 1 coating clays from a soft Georgia crude.

Generally, suitable sources of borate ions are compounds of the formula $nX_2O.mB_2O_3$, in which "$n$" is 0 (in the case of $B_2O_3$) or 1; "X" is a cation selected from the group consisting of hydrogen (in the case of $H_3BO_3$), alkali metal, ammonium, alkaline earth metal, aluminum, zinc or mixtures thereof; and "$m$" is a number within the range of 1 to 6. Alkali metal (sodium potassium and lithium) and ammonium borates, especially ammonium biborate, are preferable to borate salts of polyvalent metals because they do not introduce cations which may interfere with the rheological properties of the clay product. Similarly, boric acid does not introduce potentially interfering cations. Further, the acid will not increase pH significantly, as will alkaline borate salts. The use of boric acid will therefore avoid a subsequent acidification step which may be necessary in order to filter clay treated with alkaline borate salts. Further, a noteworthy improvement in clay brightness may be realized when boric acid is employed as the source of borate ions. Mixtures of borate compounds, exemplified by mixtures of boric acid and borax, may be employed. Borax is preferred for reasons of economy. Boric oxide may be excessively costly.

Generally the borate compound is employed in amount within the range of 0.1 perecnt to 1 percent based on the weight of the clay (the clay weight and the salt being expressed on a chemically hydrated weight basis). When used in insufficient amount the improvement in opacity of the product may not be as significant as when larger amounts are employed. When used in excess amount, the addition of a borate salt is detrimental to the rheology of the clay. An optimum proportion of borate compound may be expected to vary inter alia with borate species, nature of the clay, clay solids in the acidic clay-water system and the point of addition of the borate compound. Generally it is recommended to add 0.5 percent borate compound in an initial test and to make slight upward and downward variations in that quantity in attempts to determine an optimum proportion of additive.

Satisfactory results have been achieved when a borate salt was added as solids and as an aqueous solution (e.g., a solution of 10 percent concentration).

When added prior to filtration, in accordance with a presently preferred embodiment of the invention, only a fraction (typically one-tenth of the boron content of the borate additive may be detectable in the finished clay pigment. At any rate, conventional wet analysis indicates that a major proportion of the borate reports in the filtrate. The zinc ion content of the clay frequently decreases after filtering and washing. These observations lead to the postulate that the improvement in opacity is the result of a physical phenomenon and is not the result of in situ precipitation such as occurs when carrying out the alkali thickening process described in the Feldenheimer patent (supra).

It has been found that the desired increase in opacity has been realized when the clay to which the borate is added contains more than a trace of zinc ion (i.e., in excess of 100 p.p.m. zinc ion). Clays containing from 200 to 600 p.p.m. zinc ion are usually obtained as an inherent result of using zinc hydrosulfite as a bleach reagent and washing the filter cakes with a conventional amount of water. Generally, zinc hydrosulfite bleaches are employed in amount within the range of 2 to 15 lbs./ton clay, especially 5 to 10 lbs./ton, depending upon the nature of the clay. Excellent results have been realized with such clays. Comparable results have been achieved when a clay was bleached with sodium hydrosulfites and a soluble zinc salt was added to the pulp of bleached clay. The zinc ion content of some clay crudes may be sufficiently high to obviate the need to incorporate a source of zinc ions. Zinc must be present as an acid-soluble compound.

When reduction bleach follows oxidation bleach with an oxidant that leaves residual oxidizable matter (e.g., a permanganate salt) somewhat larger quantities of zinc hydrosulfite may be required. So-called "in situ" bleaching may be carried out by incorporating metallic zinc and sulfur dioxide gas into an acidic clay pulp. One method is described in a copending application of M. Phillip Jameson, Ser. No. 43,590, filed June 4, 1970. The term "zinc hydrosulfite" is intended to encompass in situ bleaches including the bleach reagent formed in carrying out the Jameson bleaching method. Complexes such as zinc formaldehyde sulfoxylate may be used to bleach the clay and to incorporate zinc ions with the clay. Mixtures of sodium and zinc hydrosulfites may be employed for the same purpose.

Bleaching with hydrosulfite salts is normally carried out at a pH maintained below 4. Since alkaline borate salts increase pH and have a buffering action, it is generally preferable to bleach and then to add such borate salt.

In practicing the invention a kaolin crude is normally subjected to the conventional wet processing including blunging, degritting, fractionation and bleaching of a desired fine size fraction(s). Normally the clay is bleached at 15 percent to 30 percent solids (e.g., 30 parts by weight clay, dry clay basis, to 70 parts by weight water).

In carrying out a preferred embodiment in which borate ions and zinc ions are incorporated with clay prior to filtering the clay, the borate is preferably added without decanting bleach liquid. After addition of borate compound the pulp should be thoroughly mixed.

Present experience indicates that after a borate compound is mixed into a pulp, the pulp should be aged for a few minutes, e.g., 15 minutes, preferably 1 hour or more. Excellent results have been realized when a pulp containing alkaline borate salt was aged for 48 hours.

The addition of an acid-soluble borate salt, especially an ammonium or alkali metal borate salt, will result in an increase in the pH of the bleached pulp. For example, the pH may increase from a value of 2.5 up to a value within the range of about 3.0 to 4.9. If desired, the pH may be reduced after the addition of the borate salt by incorporating a suitable acid, e.g., sulfuric. However, the increase of pH as a result of addition of a suitable quantity of borate salt may not impair the filterability of the pulp and in such case the treated pulp may be filtered without adjusting the pH.

As mentioned hereinabove, clay is usually bleached in acid fluocculated pulps at 15 percent to 30 percent solids. In carrying out a preferred embodiment of the present invention, water is removed from the bleached pulp after incorporating borate ions by passing the bleached pulps through a filter. Filtration usually increases the solids of the clay-water system to above 45 percent, typically 50 percent to 60 percent. Normally the filter cake should be washed with water to remove soluble salts.

The filtered clay is in the form of a semisolid mass. For practical use of the clay, it is placed in the form of a high solids fluid suspension, preferably a suspension containing at least 70 percent solids. This may be accomplished by adding increments of a condensed phosphate salt, e.g., tetrasodium pyrophosphate or sodium hexametaphosphate, and increments of clay to the filter cake to build up the clay solids to a desired level above 60 percent, usually 65 percent or more.

Suitable proportions of condensed phosphate dispersant may vary with the origin of the clay, the processing of the clay and the solids content of the slurry. Condensed phosphate dispersants are usually employed in amount within the range of 0.1 percent to 0.5 percent of the clay weight. A so-called "optimum" proportion of dispersant is selected by a technique generally used by the clay industry. In many cases a smaller quantity of condensed phosphate will be required to achieve "optimum" dispersion when the clay has been pretreated with borate salt.

High solids clay-water deflocculated suspensions (slips) containing the borate-treated kaolin and optimum proportion of condensed phosphate salt dispersant generally have significantly lower high shear viscosity (e.g., Hagan, Hercules viscosity) when an alkaline borate is added after bleaching and before filtering than the suspension would have in the absence of borate treatment. The improvement is especially striking when the suspensions are subjected to extremely high rates of shear. The low shear viscosity (e.g., Brookfield viscosity) is usually also reduced as a result of the addition of borate salt before filtration is carried out. In contrast, when a similar quantity of alkaline borate salt is added to acidic filter cakes during makedown, the high solids deflocculated clay-water suspensions generally have higher apparent high shear viscosities than they would have if borate salt had not been added during processing. Thus, by adding the borate salt before filtering, in accordance with a preferred mebodiment of the present invention, the rheology is usually improved. By adding borate salt at any point subsequent to filtering, rheology may be adversely affected.

In an especially preferred form of the invention, the deflocculated pulp of borate-treated clay is spray dried in conventional manner to produce a solid product in the form of coherent microspheres. When mixed with a suitable proportion of water, these microspheres form defluocculated clay-water suspensions of desired solids contents.

As noted above, the acidic filter cakes may be dried and pulverized. The acidic clay containing the borate additive may be mixed with water and deflocculating agent by the user.

It is within the scope of the invention to employ a synthetic organic polyanionic dispersant along with a condensed phosphate salt to deflocculate the clay-water system.

In preparing coating colors, conventional adhesives or mixtures of adhesives may be used. The adhesive functions to bind the clay particles to the substrate. Examples of adhesives are synthetic latices, e.g., styrene-butadiene, acrylics, starch (cooked or raw) and casein. The adhesives are formed into aqueous suspensions or dispersions before they are mixed with the deflocculated slip of borate-treated clay. When using casein, the usual practice of precooking the casein in the presence of ammonia (or source of ammonia) is followed. The effectiveness of the borate additive on coated film properties tends to be minimized as the starch level of the binder increases or when high concentrations of cationic adhesives are employed.

Conventional proportions of pigment and adhesive may be used. If desired, blends of the borate-treated kaolin clay with other pigments such as conventionally processed kaolins, satin white, calcium carborate and titanium dioxide may be employed.

The following examples are given for illustrative purposes. The invention is not limited, however, to the use of the specific clays and adhesives that were employed.

In the examples, test results were obtained by the following TAPPI (Technical Association of the Pulp and Paper Industry) procedures:

75° gloss—TAPPI Standard T480 ts–65
B & L opacity—TAPPI Standard T425–M–60
G. E. brightness—TAPPI Standard T452–M–58

In measuring printing properties by the so-called 75° Gloss Ink Holdout Test, the procedure used was one described in a publication by Otto P. Berberich, "Testing Printability of Paper and Board With Ink—III." November 1957 IPI. The procedure gives results relative to the printing qualities on a letter press proofpress using halftone printing plates.

The K & N Ink Holdout Test is described in U.S. 3,066,035 to Charles G. Albert and entails applying an excess of heavy bodied black pigmented oil ink printing ink to coated paper, removing the excess and ascertaining the contrast between the image and the background.

EXAMPLE I

This example illustrates the use of ammonium biborate to improve the opacity of coatings pigmented with ultrafine hard kaolin. In the example the borate salt was incorporated into a pulp of zinc hydrosulfite bleached clay prior to filtration, washing and deflocculation with a condensed phosphate salt and spray drying.

A hard gray kaolin clay crude from a mine near McIntyre, Ga. was blunged in water, fractionated to about 100 percent minus 2 microns with a mixture of soda ash and sodium silicate, deflocculated and beneficiated by anionic froth flotation with an added calcite reagent. The froth (a concentrate of particles of yellow anatase impurities mixed with particles of the calcite flotation reagent) was separated from the underflow (the dilute slip of purified clay). The reagents and procedure that were used are described in U.S. 2,990,958 to Greene et al.

A sample of the underflow from the flotation cells was flocculated by adding sulfuric acid to a pH below 3. Water was removed from the flocs by decantation. The flocculated suspension of beneficiated hard clay which remained had a solids content of about 22 percent. The pulp was bleached by the method described in U.S. 3,353,668 to Duke. Seventy-four pounds of the 22 percent solids suspension was bleached by adding 18.9 gm. potassium permanganate as a dilute aqueous solution, mixing for an hour and allowing the suspension to age with agitation for 48 hours. Zinc hydrosulfite was added in amount of 56.6 gm., following which the suspension was agitated for 30 minutes; during this time sulfuric acid was added in increments to maintain the pH at 3.0. The suspension was allowed to stand for 60 minutes and then it was divided into three batches: (1) a control (pH 2.9) to which no ammonium biborate would be added; (2) an experimental suspension to which ammonium biborate would be added without adjustment of pH; and (3) a suspension to which ammonium biborate would be added, with addition of sulfuric acid to reduce pH to essentially that of the control. The purpose of providing suspensions with ammonium biborate at the two different pH values was to determine how the effectiveness of the ammonium biborate would vary with pH level.

The ammonium biborate that was used to treat suspensions (2) and (3) was commercial hydrated ammonium biborate and it was used in both instances in amount of 0.5 percent based on the calculated moisture-free weight of the clay that was present. After addition of the borate salt, the suspensions were agitated for 15 minutes.

The three suspensions were then separately filtered on vacuum filters and each cake was rinsed twice, using 1500 ml. of distilled water for each washing. The specific resistance of the cakes from (1) and (2) were $11.0 \times 10^3$ ohm-cm.; the specific resistance of the cake from (3) was $14.7 \times 10^3$ ohm-cm.

Portions of each filter cake were separately dried at 180° F. for 24 hours and the dried cakes were pulverized through a 0.030" screen.

To determine the optimum dispersant (tetrasodium pyrophosphate or TSPP) demand for each clay product, the procedure described in U.S. 3,326,705 to James B. Duke was used. It was found that clays from pulps (1) and (2) required 0.30 percent TSPP and that clay from pulp (3) required 0.35 percent TSPP.

Batches of each of the washed filter cakes were then deflocculated with the predetermined optimum proportion of dispersant and the deflocculated clay-water system were spray dried at about 50 percent solids to produce microspheres. The pH of the deflocculated slips from suspensions (2) and (3) were increased to 9.2 and 10.2, respectively, by adding ammonium hydroxide solution before spray drying.

The microspheres were prepared into 70.5 percent solids slips by the procedure mentioned above.

The apparent high shear and low shear viscosities of the high solids deflocculated slips were then measured with Hercules and Brookfield viscometers. U.S. 3,326,705 to James B. Duke, supra, includes a reference describing the Hercules viscometer and describes the technique employed to obtain a "Hercules end point" viscosity value. The Hercules end point values represent the torque (dyne-cm.) at a bob speed of 1100 r.p.m. When tested with the Hercules viscometer, a fluid of highest apparent viscosity traces a torque vs. bob speed curve with the maximum shearing force at a maximum rate of shear. Apparent high shear viscosity therefore varies inversely with Hercules end point value reported as dyne-cm. at 1100 r.p.m. The Brookfield viscometer is a rotational instrument of the type described in Kirk-Othmer's "Encyclopedia of Chemical Technology," vol. 14, page 770 (First edition). The Brookfield instrument provides apparent viscosity values in centipoises.

It was found that the addition of 0.5 percent ammonium biborate to a suspension of bleached hard kaolin clay before filtration decreased both the high shear (Hercules) and low shear viscosity of a high solids deflocculated slip of the clay. Thus, without addition of ammonium biborate a 70.5 percent solids slip of the bleached hard clay developed a torque of $4.4 \times 10^5$ dyne-cm. at a bob speed of 1100 r.p.m. With ammonium biborate addition (and without pH adjustment) the slip had a high shear viscosity of only $2.8 \times 10^5$ dyne-cm. at 1100 r.p.m. Brookfield viscosities were 1600 and 800 cp. at 10 and 100 r.p.m, respectively, when no ammonium biborate was added. With ammonium biborate (no pH correction) the corresponding viscosities were only 880 and 275 cp.

When ammonium biborate was added and the pH was reduced to that of the control the high shear viscosity was further reduced. The low shear viscosity was slightly greater than it was when ammonium biborate was added and the pH was adjusted to correspond to that of the control.

Thus, clay-water rheology was improved when a small amount of ammonium biborate was added before filtration to a clay suspension which had been bleached with zinc hydrosulfite. Moreover, the improvement could be realized without reducing the pH of the ammonium biborate treated suspension.

Tests were carried out to determine whether the addition of ammonium biborate before filtration would result in the beneficial effects of coated film properties that had been realized when the salt had been added after filtration.

Forty-five percent solids clay coating colors containing a mixture of protein and latex as the binder were prepared with each of the high solids slips. To 340 gm. of each 70.5 percent solids slip there was added 36 gm. "LV Alpha Protein" solution (20 percent solids), followed by mixing for 10 minutes, adding 67.2 gm. "Dow 620" latex (a butadiene-styrene latex at 50 percent solids), mixing for 5 minutes and screening through a 325 mesh screen.

Viscosity measurements showed that the high shear viscosities of the three coating colors were similar—generating torques of 1.6, 1.3 and 1.6 dyne-cm.$\times 10^5$ at 1100 r.p.m. for colors prepared with clays (1), (2) and (3). The coating colors containing ammonium biborate were lower in Brookfield viscosity.

Each coating color was then coated on Oxford rawstock (44 lb. basis weight) at a coat weight of 7 lbs./3000 ft.$^2$. This rawstock has a high brightness (about 81.3 percent) and high opacity (typically about 90 percent B & L opacity). The high brightness and opacity of the rawstock minimize improvements resulting from coatings per se. The coated sheets were supercalendered (room temperature, about 75° F.) through 2 nips at 500 p.l.i.

Calendered sheets coated with the clays which had been processed with ammonium biborate had higher opacity (about 0.6 percent), increased brightness (0.5 percent), reduced pick and improved gloss when compared to sheets coated with clay without ammonium biborate pretreatment.

EXAMPLE II

The general procedure of Example I was carried out with a different type of kaolin clay pigment, namely a mechanically ground coarse size fraction of soft kaolin clay.

The kaolin clay had been obtained by subjecting a deflocculated pulp of coarse size fraction (about 5 microns equivalent spherical diameter) of a soft Georgia kaolin clay to anionic froth flotation to remove colored impurities from the clay pulp, grinding the beneficiated clay in the deflocculated pulp with sand by means of the technique described in U.S. Pat. No. 3,097,801 to Duke and recovering a slip containing a fine size fraction of sand-ground, flotation beneficiated clay at least 90 percent by weight of which was finer than 2.0 microns, equivalent spherical diameter.

The slip containing the fine size fraction of clay was flocculated with sulfuric acid and bleached at 22 percent solids with zinc hydrosulfite at a pH of 2.5. The suspension was then subdivided into portions.

One portion was filtered and the cake was fluidized by adding TSPP in amount of 0.45 percent based on the moisture-free weight of the clay. The resulting slurry was spray dried at 58.5 percent solids to produce control microspheres.

To another portion of the flocculated suspension of bleached clay at 22 percent solids, ammonium biborate tetrahydrate was added in amount of 0.5 percent of the moisture-free clay weight before the suspension was filtered, deflocculated with TSPP and spray dried.

It was found that the control clay could be formulated at a maximum solids of 60.8 percent. At this solids level, the optimum proportion of TSPP was 0.35 percent based on the moisture-free clay weight. The clay to which ammonium biborate had been added could be prepared into a 62.2 percent solids deflocculated slip using 0.30 percent TSPP. Both slips had acceptable high and low shear viscosities.

Portions of the microspheres were prepared into conventional coating colors with a starch adhesive ("Penford Gum 280"). The colors were coated on St. Regis basestock at about 5 lbs./3000 ft.$^2$ coat weight and the coated sheets were dried and supercalendered with 2 nips (75° F.) at 500 p.l.i.

Sheets containing clay processed with 0.5 percent ammonium biborate during makedown had calendered opacities of 91.0 percent, an outstanding increase of 2.2 percent over the control (88.8 percent opacity). 75° gloss was 44.8 percent when borate was added as compared to a 34.7 percent calendered gloss when borate was not added. Calendered sheet brightness was 71.8 percent when borate had been used and 69.4 percent when no borate salt had been employed.

EXAMPLE III

This example shows the effectiveness of borax and ammonium biborate in improving the properties of a hard clay which had been bleached with sodium hydrosulfite and contained added zinc salt.

The general procedure of Example I was followed with a crude hard clay up to and inclusive of the permanganate oxidation step. At this point sodium hydrosulfite was used in lieu of the zinc hydrosulfite. To the pulp of bleached beneficiated fine particle size hard clay there was dissolved 6.4 lbs./ton zinc hydrosulfite as a source of zinc ions. The pulp was divided into three portions—one a control (pH 3); a second to which borax (ACS grade) was added in amount of 0.54 percent based on the weight of the clay, followed by addition of sulfuric acid to pH 3.0; and a third to which ammonium biborate (technical grade) was added in amount of 0.54 percent, based on the weight of the clay, followed by addition of sulfuric acid to pH 3.0. The three pulps were aged overnight, filtered and washed with distilled water to resistances within the range of 8700 to 8900 ohm-cm. The filter cakes were deflocculated by addition of TSPP in amount of 0.3 percent based on the clay weight and the deflocculated slurries were spray dried at 50 percent solids as in Example II. The resulting microspheres were prepared into coating colors with "Stayco" M starch adhesive (18 parts adhesive to 100 parts of clay). The colors were applied to Oxford basestock at a coat weight of 8.8 lb./3300 ft.$^2$. The sheets were supercalendered with 2 nips (80° F.) at 500 p.l.i.

Sheet properties were measured with the results shown in Table I.

TABLE I.—EFFECT OF ADDING 0.5 PERCENT OF ALKALINE BORATE SALTS BEFORE FILTERING BLEACHED HARD KAOLIN CONTAINING ADDED ZINC IRON

| Sheet properties | Borate salt | | |
| --- | --- | --- | --- |
| | None | 0.5% borax | 0.5% ammonium biborate |
| Uncalendered; | | | |
| B&L opacity, percent | 91.7 | 92.3 | 92.2 |
| Brightness, percent | 78.2 | 79.2 | 79.4 |
| 75° gloss, percent | 12 | 14 | 14 |
| Supercalendered, 2 nips; | | | |
| B&L opacity, percent | 90.7 | 91.2 | 91.4 |
| Brightness, percent | 77.2 | 78.3 | 78.5 |
| 75° gloss, percent | 37 | 41 | 42 |
| IGT pick, VVP | 27 | 24 | 19 |
| K&N, Δ percent | 30 | 37 | 37 |

Data in Table I show that borax and ammonium biborate had similar effects on sheet properties when added to bleached hard clay during wet processing and prior to deflocculation. Both alkaline borates increased opacity and brightness before and after supercalendering). Both increased gloss, decreased pick and improved ink receptivity.

Viscosity studies showed that both borate salts decreased the low shear and high shear viscosity of 70.5 percent solids slurries of the deflocculated clay without adversity affecting the rheology of the coating colors.

EXAMPLE IV

In this example, boric acid was incorporated with a 17.5 percent solids pulp of bleached hard kaolin clay prior to filtering the pulp and deflocculating the filter cake with TSPP.

The pulp of bleached clay was prepared by subjecting a hard gray kaolin crude to the series of steps, including flotation and potassium permanganate-zinc hydrosulfite bleaching. These steps and the reagents employed are described in Example I.

One 3570 gm. portion of the pulp (pH 3.1) was used as a control. This pulp was filtered overnight and the cake was washed with 625 ml. distilled water. The cake was dried overnight at 180° F. for 18 hours and pulverized through a 0.039" screen. The brightness of the clay was measured with a G.E. instrument and found to be 89.5 percent.

To another 3570 gm. portion of the flocculated pulp (containing 625 gm. dry clay) there was added 3.13 gm. boric acid (0.5 percent, based on the dry clay weight). The pulp was heated at 160° F. to dissolve the boric acid, mixed for 15 minutes and cooled immediately to 80° F. The pH after addition of boric acid was 3.35, slightly higher than the pH was before boric acid had been added. The pulp was filtered, washed, dried and pulverized. Brightness of the clay was 90.7, an improvement of 1.2 points over the control which had been processed without addition of boric acid.

The two pulverized clays were made down in 70.6 percent solids slips containing optimum amounts of TSPP. The control required 0.55 percent TSPP (based on the clay weight). The experimental clay required 0.50 percent TSPP. The pH values of the control and experimental deflocculated slips were 6.75 and 6.70, respectively. Brookfield and Hercules viscosities were similar, indicating that the boric acid treatment did not adversely affect rheology.

The slips were prepared into 50 percent solids starch coating colors by mixing 354.6 gm. slip with 10.0 gm. water and 225.0 gm. "Stayco" M starch solution at 20 percent solids. The pH of both colors was adjusted to 9.0 by addition of dilute ammonium hydroxide solution. The two coating colors had similar high shear and low shear viscosities. The colors were applied to Oxford paper basestock at coat weights of about 6 lbs./3000 ft.$^2$. The basestock had a G.E. brightness of 80.4 percent and a B & L opacity of 86.1 percent. The sheets were supercalendered, 2 nips cold, 500 p.l.i.

The properties of the sheets are summarized in Table II.

TABLE II.—EFFECT OF INCORPORATING BORIC ACID WITH A PULP OF BLEACHED HARD CLAY ON THE PROPERTIES OF CLAY PIGMENTED PAPER

|  | Control | Boric acid added, 0.5% wt. |
|---|---|---|
| Uncalendered sheets: |  |  |
| G.E. brightness, percent | 81.9 | 82.3 |
| 75° gloss, percent | 26.2 | 26.6 |
| B&L opacity, percent | 89.4 | 90.0 |
| Supercalendered, 2 nips: |  |  |
| G.E. brightness, percent | 80.9 | 81.6 |
| 75° gloss, percent | 48.5 | 49.6 |
| B&L opacity, percent | 88.4 | 89.2 |
| IGT pick, VVP | 33.4 | 39.7 |
| K&N ink, percent | 25.0 | 29.3 |

The data in Table II show that the clay which had been processed with boric acid, in accordance with the present invention, produced a brighter, more opaque calendered sheet having improved pick resistance and ink receptivity. The improvement in sheet brightness (0.7 point) would be expected to minimize the apparent improvement in opacity. Thus, the 0.8 point apparent increase in opacity would have been even greater if the presence of the experimental clay had not significantly brightened the coated paper.

Data in this example therefore demonstrate that the addition of a small amount of boric acid to a pulp of bleached gray clay before filtering the pulp resulted in a remarkably brighter clay pigment. Further, the data show that this brighter pigment resulted in a more opaque, brighter coating having improved printing properties. Also demonstrated is that the use of boric acid during wet processing of clay did not adversely affect rheological properties of the clay.

Examples V to X illustrate an embodiment of the invention wherein borate compounds are added during makedown (after filtration) but before addition of substantial phosphate deflocculant.

In Examples V, VI, VIII and IX, filter cakes of bleached hard kaolin were employed. This clay was obtained from hard kaolin clay crudes from a mine near McIntyre, Georgia. The crudes were blunged in water, fractionated to about 100 percent minus 2 microns, deflocculated and beneficiated by froth flotation with an anionic collector. In each case the flotation tailings were separated from the froth (a concentrate of yellow anatase impurity) and the tailings were thickened by adding acid to flocculate the clay and remove water from the flocs. The flocs were then bleached by adding potassium permanganate solution and then zinc hydrosulfite solution in the presence of sulfuric acid, as described in Example I. The bleached beneficiated hard clay was filtered and washed. In some cases undried acidic filter cakes were used as starting materials. In other examples, samples of the acid cakes were dried and pulverized in a high speed hammer mill before makedown.

In Example VII, a filter cake of high brightness, flotation beneficiated zinc hydrosulfite bleached soft kaolin clay (No. 1 clay) was employed. See U.S. 2,990,958 to Greene et al.

In Example X a filter cake of zinc hydrosulfite bleached sand-ground coarse soft kaolin was used. The steps involved in grinding and bleaching are described in Example II.

EXAMPLE V

This example demonstrates desirable effects of adding a small amount of ammonium biborate to filtered hard clay during makedown.

A sample of dry, acidic filter cake was added to water containing ammonium biborate hydrate. The clay was added with continuous mixing until further addition produced a mixture that was too viscous to handle. The mixture was then fluidized by adding TSPP in small increments (0.05 percent of the moisture-free clay weight), adding more clay, then adding increments of TSPP until the system was fluidized. The sequential addition of clay and dispersant was repeated until a 70.5 percent solids deflocculated clay slip was obtained. The pH was adjusted to 8.8 by addition of ammonium hydroxide. The quantity of ammonium biborate hydrate present in the slip was 0.5 percent based on the moisture-free clay weight. TSPP was present in amount of 0.30 percent of the moisture-free clay weight.

A control of 70.5 percent solids slip was made by using another sample of the same filter cake and an optimum proportion of TSPP (0.45 percent of the moisture-free clay weight). Again pH was adjusted to 8.8. The viscosity of this slip was similar to that of the slips containing ammonium biborate.

Experimental and control coating colors were separately prepared by mixing 312 gm. each of 70.5 percent solids clay slip with 165 gm. distilled water, 33 gm. "LV Alpha Protein" solution (20 percent solids) and 61.6 gm. styrene-butadiene latex at 50 percent solids ("Dow 620"). Each color contained 45 percent solids.

The coating colors were coated on Oxford rawstock to a coat weight of 7 lbs./3000 ft.$^2$ and the sheets were cold calendered, 2 nips, 500 p.l.i.

A summary of the optical and printing properties of the coated sheets appears in Table III.

TABLE III.—EFFECT OF AMMONIUM BIBORATE DURING MAKEDOWN ON OPTICAL AND PRINTING PROPERTIES OF PAPER COATED WITH HARD KAOLIN

| Property | Coating composition | |
| --- | --- | --- |
| | Control (no borate salt) | Experimental (0.5% NH₄-borate added) |
| 75° gloss | 52.7 | 55.8 |
| B & L opacity, percent | 90.4 | 91.7 |
| Brightness, percent | 81.4 | 82.1 |
| ΔK & N ink holdout, percent | 27.4 | 32.3 |

Data in Table III show that when ammonium biborate was added during makedown the clay-coated paper was glossier, more opaque and brighter. Results of printability tests indicate the coated sheets prepared with ammonium biborate addition during makedown had better gloss ink holdout and K & N ink receptivity.

EXAMPLE VI

A 56.0 percent solids slurry of the bleached beneficiated hard kaolin clay was prepared by agitating an undried acid filter cake with ammonium biborate (hydrated) in amount of 0.50 percent of the dry weight of the clay. Tetrasodium pyrophosphate was added in amount of 0.30 percent of the clay weight and ammonium hydroxide was then added to bring the pH to 10.6. The slurry was spray dried with an air inlet temperature of 340° C. to 350° C. and an air outlet temperature of 125° C.

The predispersed microspheres were prepared in a high solids (70.7 percent) slip by agitating the microspheres in water.

A 60.4 percent solids coating color was prepared by diluting the 70.7 percent solids dispersed slip with water to 63.0 percent solids, mixing and then adding a styrene-butadiene latex suspension ("Dow 620 Latex") in amount corresponding to 18 parts by weight latex solids to 100 parts by weight clay solids.

A control coating color without ammonium borate salt was prepared from predispersed hard clay obtained by slurrying another portion of the same filter cake in water containing 0.45 percent TSPP (based on the dry clay weight) and spray drying the slurry. The pH of the control was adjusted to a pH of 8.0 by addition of ammonium hydroxide solution.

The control coating color and the experimental coating color containing ammonium borate were separately coated on five black glass plates as described in an article by G. A. Hemstock and R. J. Bergmann, "Studies of Relationships Between Suspension and Paper Coating Film Properties," TAPPI, November 1968, vol. 511, No. 11, pp. 489 to 496. Gloss measurements (75°) were made with a Hunter Gloss Meter and brightness was obtained with an ELREPHO Brightness Meter. Coat weight of the coat on each plate was determined. From the value of the reflectance of the coating over a black body and the coat weight on the plate the scattering coefficient(s) was computed using the equation given at page 491 in the TAPPI article by Hemstock et al. (supra). Mean scattering coefficients were calculated from the "s" values for the five plates.

The means scattering coefficient of the coatings prepared with predispersed hard clay containing 0.5 percent by weight ammonium biborate was 0.14 ream/lb. The means scattering coefficient of the coatings without ammonium biborate was 0.10 ream/lb. A comparison of the results shows that the use of ammonium borate resulted in a clay coating having a significantly greater scattering coefficient and thus more reflecting interfaces. Since opacity is proportional to scattering coefficient, the results indicate that ammonium biborate will markedly improve the opacity and hiding power of the clay coating. This was confirmed by visual comparison of heavy coat weight drawdowns prepared with the two coating colors.

EXAMPLE VII

The general procedure of Example VI was repeated with a pulverized acid high brightness, flotation beneficiated, bleached (zinc hydrosulfite) soft Georgia kaolin clay (Ultra White® 90). The scattering coefficient of a clay-coated black glass plate obtained with the coating color containing ammonium biborate was 0.19 ream/lb. A black glass plate coated with the control coating color (no ammonium biborate) had a scattering coefficient of only 0.12 ream/lb. Thus, the use of ammonium biborate improved significantly the hiding power of the soft clay pigment.

EXAMPLE VIII

A filter cake of minus 1 micron floated, bleached hard clay was dried and pulverized. A suspension of ammonium biborate was obtained by mixing 5 gm. boric acid with 40 ml. 28° Bé ammonium hydroxide, heating in an open container in a 160° F. water bath for 3 minutes and cooling. This suspension was then dissolved in water and the pulverized hard clay was added to the resulting solution until the slurry was no longer workable, using 0.5 part by weight of the slurry of ammonium borate to 100 parts by weight clay. As in Example V, TSPP was added in increments, followed by additional increments of clay. The resulting deflocculated clay slip contained TSPP in amount of 0.15 percent based on the dry clay weight and was at 60.6 percent solids.

An experimental coating color (45 percent solids) was formulated by mixing the deflocculated clay-water suspensions containing the ammonium borate suspension with adhesive suspensions and distilled water. The pH of the coating color was 8.8. The coating color had the following composition.

| | Parts by weight |
| --- | --- |
| Hard clay (dry clay basis) | 100 |
| "Dow 620 Latex" | 14 |
| "LV Alpha Protein"[1] | 3 |

[1] Cut with NH₄OH solution of 12 percent concentration.

A control coating color was prepared by dispersing another portion of the same clay filter cake with 0.30 percent TSPP to form a 70 percent solids suspension and mixing the suspension with the adhesives and ammonium hydroxide to provide a composition having a total solids content of 45.0 percent and a pH of 8.8. Thus, the control and the experimental coating colors had the same pH and essentially identical solids content but differed in that the clay in the experimental color had been pretreated with ammonium biborate before being deflocculated with the sodium condensed phosphate.

Rheological properties of the two coating colors were compared. It was found that the coating color containing clay make down with ammonium borate was strikingly lower in viscosity than the experimental color having the same solids content and pH.

Each color was coated on the felt side of Oxford rawstock at a coat weight of 7 lbs./3000 ft.² From the colors were coated on the rawstock, the coated sheets were drum dried. Some of the sheets were then calendered at 75° F. (2 nips) under a pressure of 500 lb. per linear inch. Other sheets were calendered with 4 nips. Sheet properties were measured before and after calendering. Results are summarized in Table IV.

Gloss data in Table IV show that when ammonium biborate was added to the hard clay coating pigment during makedown, the coated paper was glossier than the sheet coated with the same clay coating without ammonium borate. Calendering normally minimizes differences in glass. However, even after calendering with 4 nips, the coating containing ammonium borate was still significantly glossier.

Opacity data in Table IV show that the addition of ammonium borate resulted in an increase in opcacity which was especially pronounced after calendering. If a less opaque rawstock had been used, a greater improvement in opacity would have been noted.

A comparison of K & N ink holdout data for the experimental and control coated sheets shows that the addition of ammonium borate increased ink absorption.

Data in Table IV also show that the ammonium borate increased pick resistance, thus improving the bond of the coating to the paper.

TABLE IV.—EFFECT OF ADDING AMMONIUM BIBORATE DURING MAKEDOWN ON THE PROPERITIES OF PAPER COATED WITH HARD KAOLIN CLAY

| Sheet properties | Control (no NH₄-borate) | Experimental (with 0.5% NH₄-borate) |
|---|---|---|
| Uncalendered coated sheets: | | |
| G.E. brightness, percent | 84.7 | 86.5 |
| 75° gloss, percent | 22 | 30 |
| B & L opacity, percent | 92.9 | 93.0 |
| Calendered coated sheets (2 nips): | | |
| G.E. brightness, percent | 82.9 | 83.1 |
| 75° gloss, percent | 56 | 64 |
| B & L opacity, percent | 91.8 | 92.1 |
| IGT pick resistance | 17 | 19 |
| Δ K & N ink holdout, percent | 28 | 34 |
| Calendered coated sheets (4 nips): | | |
| G.E. brightness, percent | 82.9 | 82.2 |
| 75° gloss, percent | 66 | 72 |
| B & L opacity, percent | 90.8 | 91.7 |
| IGT pick resistance | 17 | 19 |
| Δ K & N ink holdout, percent | 24 | 29 |

EXAMPLE IX

This example illustrates the addition of sodium polyborate and ammonium biborate during the makedown of bleached hard clay pigment to improve the printing properties of paper coated with the clay.

Fifteen gm. borax was added to 5 gm. boric acid in 20 gm. distilled water. The mixture was heated to 150° F. and cooled. Repeated the procedure described in Example V, the resulting aqueous reaction product was added during makedown to a filter cake of bleached hard clay using 1 part reaction product (including water) to 100 parts by weight clay. The makedown procedure of Example V was followed.

The procedure was repeated, adding 0.5 percent ammonium biborate for purposes of comparison.

A control experiment was carried out in which a borate compound was not incorporated during processing.

The three TSPP deflocculated slurries were prepared into 45 percent solids coating colors by mixing them with a suspension containing three parts by weight LV Alpha Protein and 14 parts by weight "Dow 620" latex. The coated sheets were calendered with 2 nips.

The clay processed with ammonium biborate and the reaction product of boric acid and borax produced calendered sheets (Oxford basestock) that were 0.8 and 0.9 point higher in opacity than the sheets prepared with the control clay. The sheets containing the ammonium biborate-treated clay were 0.5 percent brighter than the control sheets. The sheets coated with clay processed with the borax-boric acid reaction product were 1.6 points higher in brightness. All sheets containing borate additive had improved pick.

EXAMPLE X

This example illustrates the desirable effects of adding a small amount of zinc borate to an acidic filter cake of bleached, sandground coarse kaolin (Example II) before dispersing the cake with TSPP.

The procedures of Example V were followed with portions of the filter cake. To one portion of the acidic cake, commercial zinc borate ($3ZnO.2B_2O_3$) was added in amount of 1.0 percent of the clay weight during makedown. To another portion of the cake ammonium biborate was added in amount of 0.5 percent of the clay weight. No borate compound was incorporated in the control.

TABLE V.—EFFECT OF ADDING ZINC BORATE OR AMMONIUM BORATE TO SAND GROUND KAOLIN CLAY DURING MAKEDOWN

| | Borate salt | | | | |
|---|---|---|---|---|---|
| | 0.5% ammonium biborate | | | 1.0% zinc borate commercial grade | |
| St. Regis basestock: Coat weight, lbs./3,300 ft.² | 5.8 | 5.4 | Δ | 5.6 | Δ |
| Uncalendered: | | | | | |
| Opacity, percent | 89.9 | 91.8 | 1.9 | 91.9 | 2.0 |
| Brightness, percent | 71.6 | 73.8 | 2.2 | 74.1 | 2.5 |
| 75° gloss, percent | 9.1 | 12.1 | 3.0 | 11.7 | 2.6 |
| Calendered: | | | | | |
| Opacity, percent | 88.8 | 91.0 | 2.2 | 91.0 | 2.2 |
| Brightness, percent | 69.4 | 71.8 | 2.4 | 72.3 | 2.9 |
| 75° gloss, percent | 34.7 | 44.8 | 10.1 | 41.9 | 7.2 |

NOTE.—Δ = increase.

The results, summarized in Table V, show that zinc borate and ammonium biborate produced comparable improvements in opacity, brightness and gloss.

While the invention has been described with emphasis on effecting improvements in kaolin pigments for coating paper, it is apparent that some of the benefits, especially the improvement in opacity, may be realized when the borate-treated kaolin is employed as a pigment in other coatings, e.g., paints, especially latex paints.

I claim:

1. In the wet processing of kaolin clay to provide a coating pigment wherein an aqueous pulp of the clay is bleached with zinc hydrosulfite at a pH below 4 and the bleached pulp is filtered, the resulting filter cake is washed and then deflocculated with a condensed phosphate salt, the improvement which comprises incorporating a small amount of a source of borate ions into the acids pulp before the pulp is filtered, said source of borate ions being a compound of the formula $nX_2O.mB_2O_3$ wherein "n" is a number from 0 to 1; "X" is a cation selected from the group consisting of hydrogen, ammonium, alkali metal, alkaline earth metal, aluminum, zinc and mixtures thereof; and "m" is a number from 1 to 6 and being added in amount insufficient to neutralize or to deflocculate the pulp but sufficient to improve the opacity of coatings pigmented with the clay.

2. The method of claim 1 wherein said source of borate ions is borax.

3. The method of claim 1 wherein said source of borate ions is ammonium biborate added in amount within the range of 0.1 percent to 1 percent of the dry clay weight.

4. The method of claim 1 wherein said source of borate ions is orthoboric acid.

5. In the wet processing of kaolin clay to provide a deflocculated bleached coating pigment wherein an aqueous pulp of the clay is bleached with zinc hydrosulfite at an acidic pH and the bleached pulp is filtered, washed and the clay in the acidic filter cake is deflocculated and increased in pH by addition of a condensed phosphate salt, the improvement which comprises adding to the acidic washed filter cake, before complete addition of said phosphate salt, from 0.1 to percent to 1 percent based on the weight of the clay of a borate compound of the formula $nX_2O.mB_2O_3$ wherein "n" is a number from 0 to 1; "X" is a cation selected from the group consisting of hydrogen, ammonium, alkali metal, alkaline earth metal, aluminum, zinc and mixtures thereof; and "m" is a number from 1 to 6.

6. The method of claim 2 wherein the borax is added in amount within the range of 0.1 percent to 1 percent of the weight of the clay to a pulp of the zinc hydrosulfite bleached clay containing bleach liquor and the acidic clay pulp containing the added borax has a pH below 4 when it is filtered.

7. In the wet processing of kaolin clay to produce a clay coating pigment wherein bleached kaolin clay is provided in the form of an acidic flocculated aqueous pulp which is filtered to remove acidic pulp water and the filtered clay is washed to provide an acid clay filter cake amenable to deflocculation with a clay dispersant, the improvement, whereby the opacifying power of the clay is increased without adversely affecting the clay rheology, which improvement comprises mixing into acid acidic flocculated pulp, before the pulp is filtered, a small amount of a source of zinc ions unless the clay in the acidic pulp has been bleached with a zinc compound, and also mixing in a small amount of a source of borate ions, the amount of said source of borate ions being insufficient to neutralize or to deflocculate the pulp but being sufficient to improve the opacity of coatings pigmented with the clay.

8. The method of claim 7 wherein the borate compound is borax added in amount within the range of 0.1 percent to 1 percent of the weight of the clay.

9. The method of claim 7 wherein the acidified flocculated pulp is bleached without using a zinc compound and the source of zinc ions is an acid-soluble zinc compound added to the pulp of acidic clay after the pulp has been bleached and in amount sufficient to provide a zinc ion content of at least 100 p.p.m.

10. In the wet processing of kaolin clay to produce a clay coating pigment wherein bleached kaolin clay is provided in the form of an acidic flocculated aqueous pulp which is filtered to remove acidic pulp water and the filtered clay is washed to provide an acid clay filter cake and the filtered clay is dispersed by adding a strong clay dispersant, the improvement, whereby the opacifying power of the clay is increased, which comprises mixing a small amount of a source of zinc ions into the acidic pulp before it is filtered unless the clay had been bleached with a zinc compound and mixing a small amount of a source of borate ions with the filtered washed acidic clay before adding all of the clay dispersant, the amount of the surface of the borate ions being insufficient to neutralize or to deflocculate the acidic clay but being sufficient to improve the opacity of coatings pigmented with the dispersed clay.

11. The method of claim 10 wherein the borate compound is borax added in amount within the range of 0.1 percent to 1 percent of the weight of the clay.

12. A predispersed kaolin lay coating pigment comprising kaolin clay particles mixed with a small amount of a source of zinc ions and a small amount of a colorless, acid-soluble borate compound, the amount of said borate compound being insufficient to neutralize or to deflocculate the clay but being sufficient to improve the opacity of coatings pigmented with the clay, and a clay dispersant in an amount to deflocculate the clay.

13. A predispersed kaolin clay coating pigment consisting essentially of particles of bleached kaolin clay having an acid-soluble zinc content within the range of 200 to 600 p.p.m. and containing a small amount, sufficient to improve the opacifying properties of the clay but insufficient to deflocculate the clay, of a borate compound of the formula $nX_2O.mB_2O_3$ wherein "$n$" is a number from 0 to 1; "X" is a cation selected from the group consisting of hydrogen, ammonium, alkali metal, alkaline earth metal, aluminum, zinc and mixtures thereof; and "$m$" is a number from 1 to 6 and from 0.1 percent to 0.5 percent by weight of a condensed phosphate dispersant.

14. A predispersed kaolin clay coating pigment consisting essentially of particles of bleached kaolin clay having an acid-soluble zinc content within the range of 200 to 600 p.p.m., a small amount, insufficient to deflocculate the clay but sufficient to improve the opacifying properties of the clay, of borax, and from 0.1 percent to 0.5 percent of a sodium condensed phosphate salt.

15. The pigment of claim 14 wherein said kaolin clay is a fine size fraction of a hard kaolin clay crude.

16. The pigment of claim 14 wherein said kaolin clay is a fine size fraction of a soft kaolin clay crude.

17. The pigment of claim 14 wherein said kaolin clay is a fraction of mechanically ground coarse soft kaolin clay.

18. An improved kaolin clay coating pigment consisting essentially of a paper coating fraction of mechanically ground coarse kaolin clay containing from 0.1 percent to 1 percent by weight of zinc borate and from 0.1 percent to 0.5 percent by weight of a sodium condensed phosphate dispersant.

19. A kaolin clay coating pigment consisting essentially of particles of kaolin clay having an acid-soluble zinc content within the range of 200 to 600 p.p.m. and a small amount, insufficient to neutralize or to deflocculate the clay but sufficient to improve the opacity of the clay, of a colorless acid-soluble borate compound, said pigment being acidic and capable of being deflocculated with a sodium condensed phosphate clay dispersant to form a high solids deflocculated clay-water slurry having acceptable rheology for formulation in a paper coating composition.

References Cited
UNITED STATES PATENTS

| | | | |
|---|---|---|---|
| 2,251,256 | 7/1941 | Feldenheimer | 106—72 |
| 3,320,027 | 5/1967 | Maynard et al. | 106—72 |
| 3,337,048 | 8/1967 | Mercade | 106—72 |
| 3,477,809 | 11/1969 | Bundy et al. | 106—72 |
| 3,489,586 | 1/1970 | Chapman et al. | 106—288 B |

JAMES E. POER, Primary Examiner

U.S. Cl. X.R.

106—72